United States Patent [19]

Lampe

[11] Patent Number: 5,560,315
[45] Date of Patent: Oct. 1, 1996

[54] PET FOOD DISH

[76] Inventor: Thomas Lampe, 3371 Paxton Ct., Marietta, Ga. 30066

[21] Appl. No.: 502,378

[22] Filed: Jul. 14, 1995

[51] Int. Cl.$^6$ .............................. A01K 5/01; A01K 7/00
[52] U.S. Cl. ...................... 119/51.5; 119/61; 220/23.83
[58] Field of Search .................. 119/61, 51.5, 63; 206/541, 546, 223, 514; 220/23.83, 23.86, 306, 503, 505

[56] References Cited

U.S. PATENT DOCUMENTS

| | | | |
|---|---|---|---|
| 3,589,554 | 6/1971 | Smith | 206/514 X |
| 4,128,080 | 12/1978 | Haney | 119/61 X |
| 4,951,832 | 8/1990 | Tenney et al. | 220/23.83 |
| 5,277,149 | 1/1994 | East | 119/51.5 |
| 5,458,087 | 10/1995 | Prior et al. | 119/51.5 |

FOREIGN PATENT DOCUMENTS

| 5317174 | 12/1993 | Japan | 206/505 |
|---|---|---|---|

*Primary Examiner*—Robert P. Swiatek
*Assistant Examiner*—Elizabeth Shaw

[57] ABSTRACT

A dish for containing food and water for consumption by an animal. The inventive device includes an outer container for containing a volume of water. An inner container is secured within the outer container for supporting pet food such that insects cannot reach the food across the water. Lids can be secured to each container to permit transportation and storage of the device when containing both water and food.

12 Claims, 3 Drawing Sheets

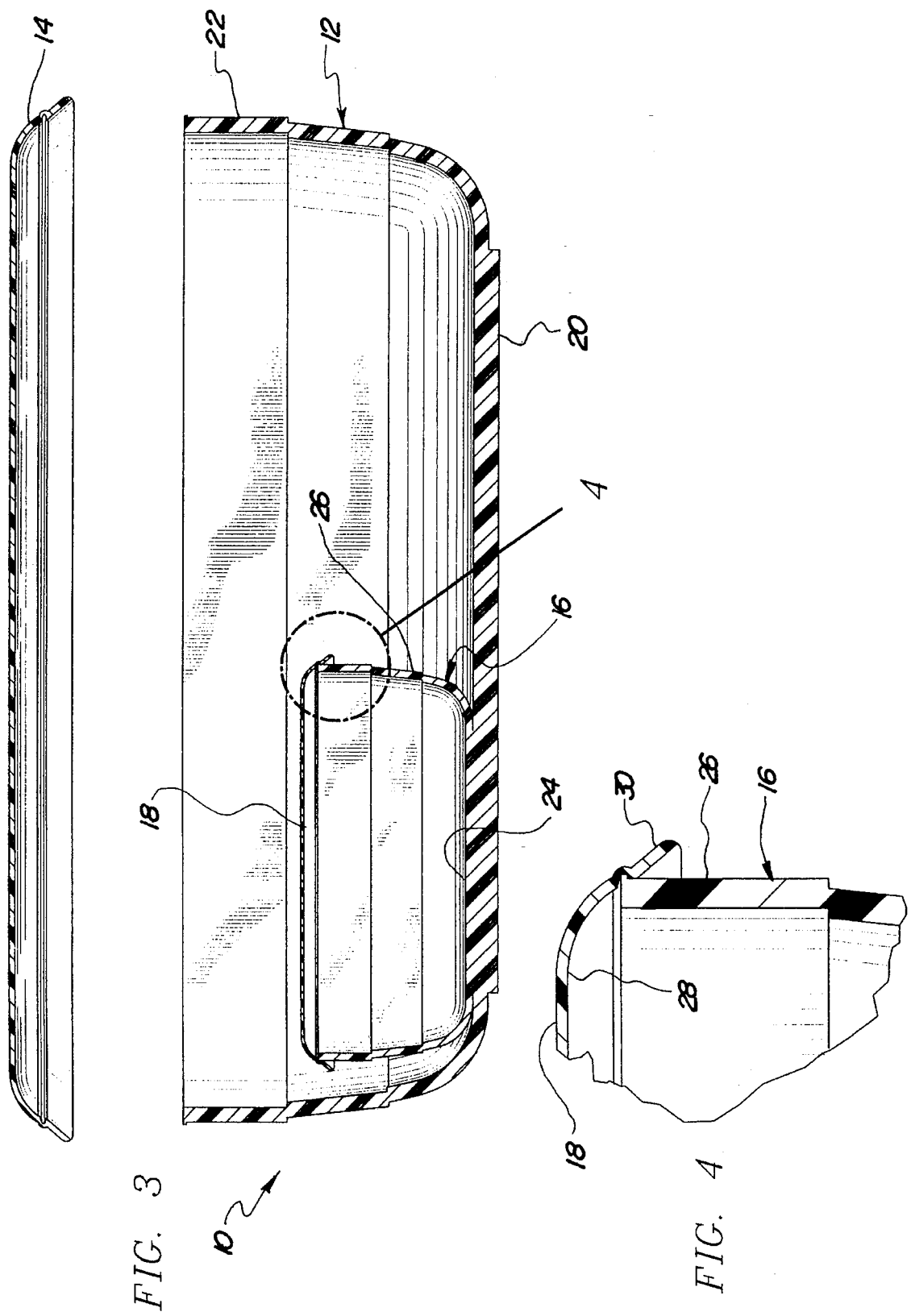

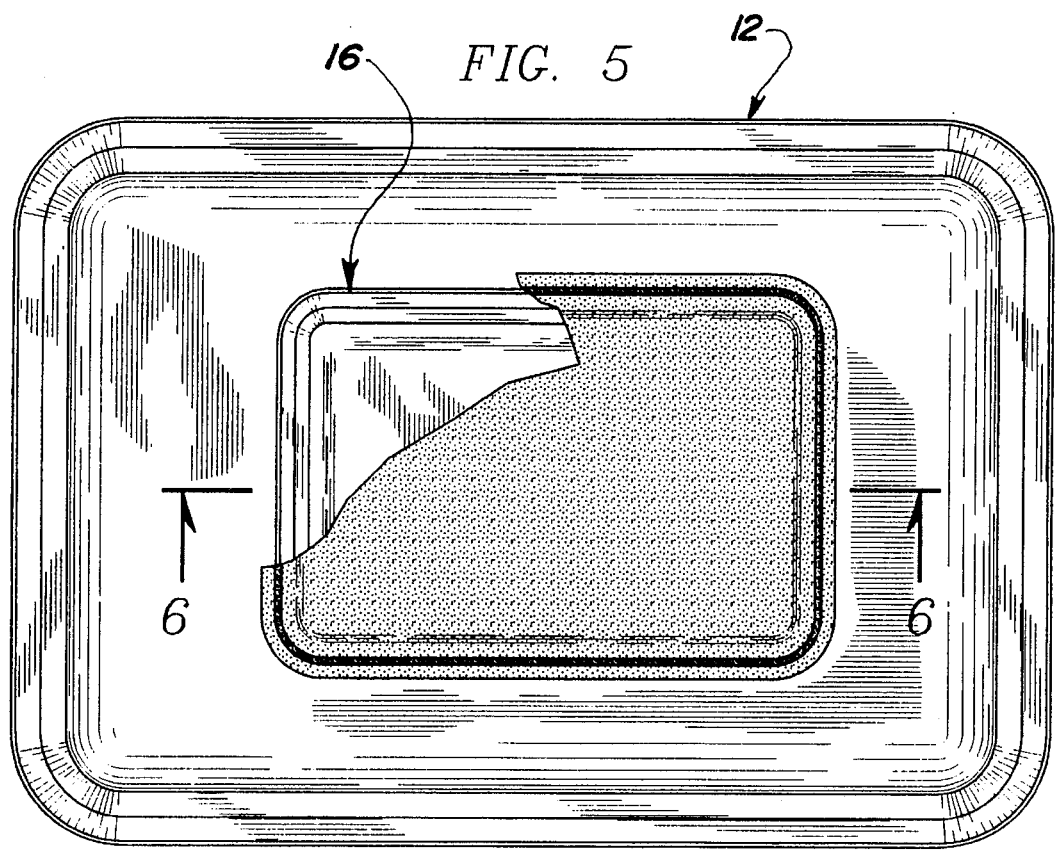
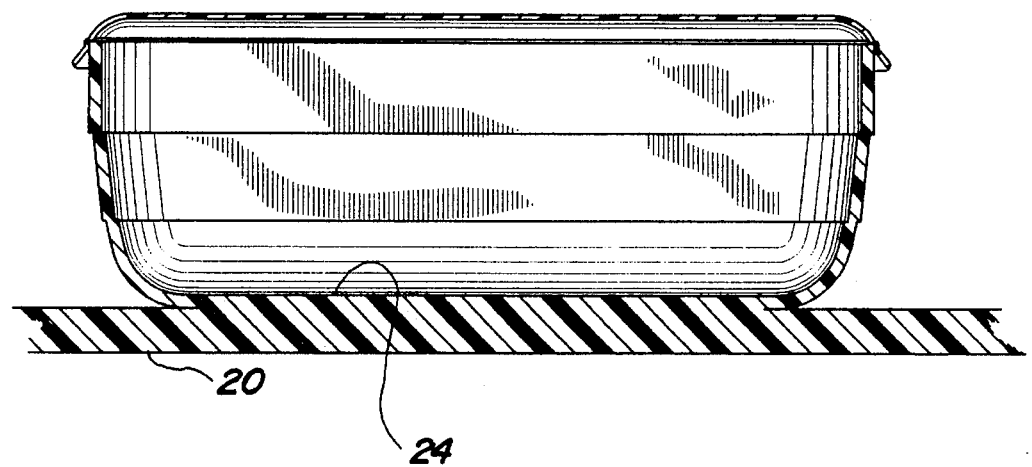

PET FOOD DISH

BACKGROUND OF THE INVENTION

1. Field of the Invention

The present invention relates to animal feeding devices and more particularly pertains to a pet food dish for containing food and water for consumption by an animal.

2. Description of the Prior Art

The use of animal feeding devices is known in the prior art. More specifically, animal feeding devices heretofore devised and utilized are known to consist basically of familiar, expected and obvious structural configurations, notwithstanding the myriad of designs encompassed by the crowded prior art which have been developed for the fulfillment of countless objectives and requirements.

Known prior art animal feeding devices include U.S. Pat. No. 5,277,149; U.S. Pat. No. 5,117,778; U.S. Pat. No. 5,245,948; U.S. Pat. No. 5,253,609; U.S. Design Pat. No. 342,353; and U.S. Design Pat. No. 326,742.

While these devices fulfill their respective, particular objectives and requirements, the aforementioned patents do not disclose a pet food dish for containing food and water for consumption by an animal which includes an outer container for container a volume of water, an inner container secured within the outer container for supporting pet food such that insects cannot reach the food across the water, and lids which can be secured to each container to permit transportation and storage of the device when containing both water and food.

In these respects, the pet food dish according to the present invention substantially departs from the conventional concepts and designs of the prior am and in so doing provides an apparatus primarily developed for the purpose of containing and food and water for consumption by an animal.

SUMMARY OF THE INVENTION

In view of the foregoing disadvantages inherent in the known types of animal feeding devices now present in the prior art, the present invention provides a new pet food dish construction wherein the same can be utilized for supporting food and water for consumption by an animal. As such, the general purpose of the present invention, which will be described subsequently in greater detail, is to provide a new pet food dish apparatus and method which has many of the advantages of the animal feeding devices mentioned heretofore and many novel features that result in a pet food dish which is not anticipated, rendered obvious, suggested, or even implied by any of the prior art animal feeding devices, either alone or in any combination thereof.

To attain this, the present invention generally comprises a dish for containing food and water for consumption by an animal. The inventive device includes an outer container for containing a volume of water. An inner container is secured within the outer container for supporting pet food such that insects cannot reach the food across the water. Lids can be secured to each container to permit transportation and/or storage of the device when containing both water and food.

There has thus been outlined, rather broadly, the more important features of the invention in order that the derailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the, present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the an who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

It is therefore an object of the present invention to provide a new pet food dish apparatus and method which has many of the advantages of the animal feeding devices mentioned heretofore and many novel features that result in a pet food dish which is not anticipated, rendered obvious, suggested, or even implied by any of the prior art tool guides, either alone or in any combination thereof.

It is another object of the present invention to provide a new pet food dish which may be easily and efficiently manufactured and marketed.

An even further object of the present invention is to provide a new pet food dish which is susceptible of a low cost of manufacture with regard to both materials and labor, and which accordingly is then susceptible of low prices of sale, to the consuming public, thereby making such pet food dishes economically available to the buying public.

Still yet another object of the present invention is to provide a new pet food dish which provides in the apparatuses and methods of the prior art some of the advantages thereof, while simultaneously overcoming some of the disadvantages normally associated therewith.

Still another object of the present invention is to provide a new pet food dish for containing food and water for consumption by an animal.

Yet another object of the present invention is to provide a new pet food dish which includes an outer container for container a volume of water, an inner container secured within the outer container for supporting pet food such that insects cannot reach the food across the water, and lids which can be secured to each container to permit transportation and storage of the device when containing both water and food.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will became apparent when consideration is given to the following detailed description thereof. Such description makes reference to the annexed drawings wherein:

FIG. 3 is cross sectional view taken along line 3—3 of FIG. 2.

FIG. 4 is an enlarged cross sectional view of the area set forth in FIG. 3.

FIG. 5 is top plan view of an alternative form of the present invention.

FIG. 6 is a cross sectional view taken along line 6—6 of FIG. 5.

DESCRIPTION OF THE PREFERRED EMBODIMENT

Figure 1:
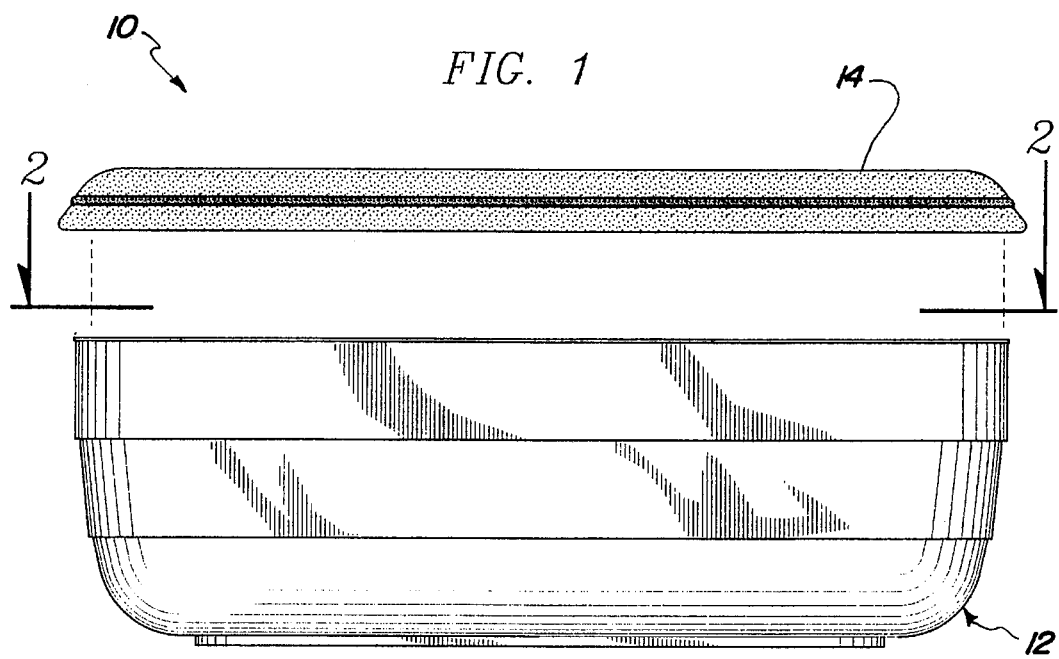
FIG. 1 is a front elevation view of a pet food dish according to the present invention.

With reference now to the drawings, and in particular to FIGS. 1–6 thereof, a new pet food dish embodying the principles and concepts of the present invention and generally designated by the reference numeral 10 will be described.

More specifically, it will be noted that the pet food dish 10 comprises an outer container 12 having an outer container lid 14 sealingly securable across an open upper end of the outer container. An inner container 16 is positioned completely within the outer container 12 and secured to an interior portion thereof. An inner container lid 18 is sealingly engagable to the inner container 16 so as to extend across an open upper end thereof. The inner container 16 is spaced from an interior surface of the outer container 12 such that when fluid is positioned within the outer container it completely surrounds the inner container 16 to preclude access by insects and other rodents to the inner container. By this structure, water can be positioned within the outer container 12 so as to surround the inner container 16, with pet food being positioned in the inner container such that an animal may selectively consume either the food or the water as desired.

Figure 2:
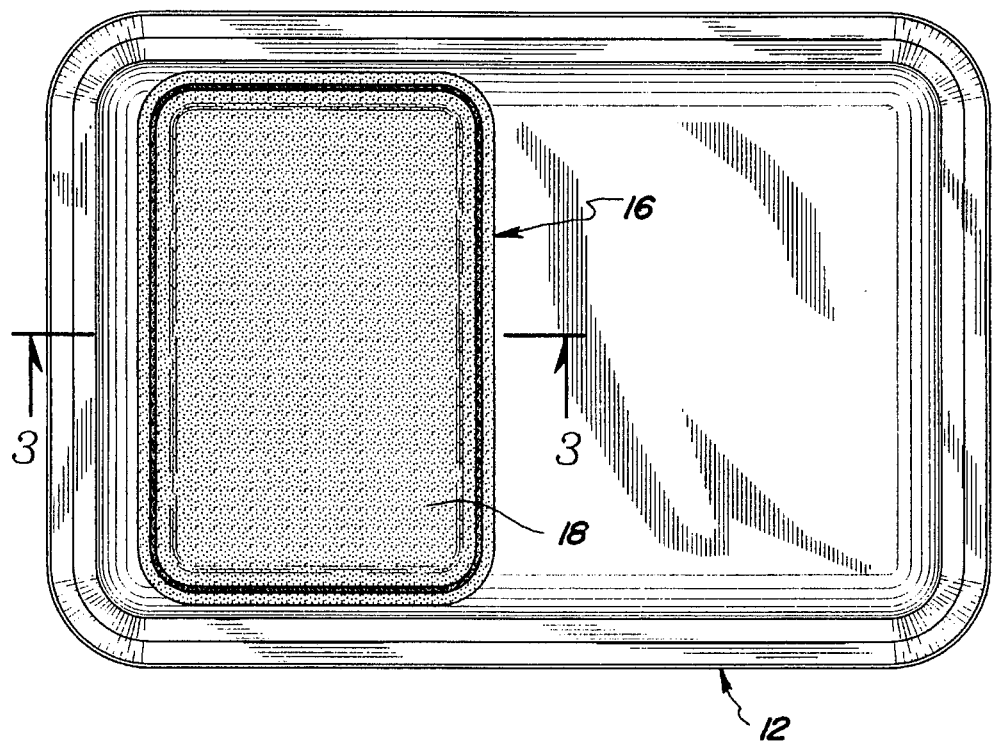
FIG. 2 is top plan view of the present invention taken from line 2—2 of FIG. 1.

Referring now to FIGS. 2 through 4 wherein the present invention 10 is illustrated in detail, it can be shown that the outer container 12 preferably comprises a substantially rectangular outer container bottom wall 20 having an outer container perimeter side wall 22 projecting upwardly from an outer peripheral edge of the outer container bottom wall. The outer perimeter side wall 22 extends upwardly from the outer container bottom wall 20 and terminates in an upper free edge. An unlabeled projecting flange extends from the upper free edge of the outer container perimeter side wall 22 and is cooperatively engagable with an interior groove extending about an interior surface of the outer container lid 14 as shown in FIG. 3 of the drawings. By this structure, the outer container lid. 14 can be selectively snapped over the open upper end of the outer container 12, whereby the flange will cooperatively engage with the groove of the outer container lid 14 so as to secure the lid relative to the outer container 12.

With continuing reference to FIGS. 2 through 4, it can also be shown that the inner container 16 similarly comprises an inner container floor 24 which is integrally or otherwise fixedly secured to an interior surface of the outer container bottom wall 20 as shown in FIG. 3 of the drawings. An inner container perimeter side wall 26 projects upwardly from an outer peripheral edge of the inner container floor and terminates in an upper free edge. A flange extends from the upper free edge of the inner container perimeter side wall 26 of the inner container 16 and is cooperatively engagable to a correspondingly shaped groove formed along an interior surface of the inner container lid 18 so as to permit sealing engagement of the inner container lid 18 to the inner container 16 in a manner similar to that described above for the outer container lid 14 to the outer container 12.

The lids 14 and 18 are substantially similar in design and configuration and each include a substantially rectangular planar member 28 having an angled side wall 30 projecting outwardly at an oblique angle relative thereto from an outer peripheral edge of the planar member. The groove matable with the flange of the respective side wall 22 or 26, extends along an interior surface of the angled side wall 30 of the respective lid 14 or 18. Preferably, the device 10 is constructed entirely of a substantially resilient plastic material permitting the lids 14 and 18 to be snapped fitted onto the flanges projecting from the respective perimeter side walls 22 and 26 of the; respective containers 12 and 16. By this structure, food positioned within the inner container 16 can be sealingly secured therein, with water positioned within the outer container 12 being sealingly secured therein by the outer container lid 14, whereby the entire device 10 may then be transported absence a possibility of the water contacting the pet food within the sealed inner container 16.

Referring now to FIG. 2 of the drawings, it can shown that the inner container 16 is preferably oriented such that a longitudinal length thereof extends transversely across an interior of the outer container 12. To this end, it is desirable that a longitudinal dimension of the inner container 16 be substantially less than a transverse width of the outer container 12 so as to permit such orthogonal positioning of the inner container 16 therein. Further, it is desirable that the outer container 12 be symmetrically oriented about a transverse axis directed transversely across and bisecting the outer container and oriented substantially orthogonally relative to a longitudinal axis of the outer container 12, with the inner container 16 residing laterally of the transverse axis bisecting the outer container. By this structure, an animal utilizing the device 10 is afforded a full depth of the outer container 12 along another side of the transverse axis so as to facilitate ease of lapping of water therefrom.

Alternatively, the present invention 10 may be configured as shown in FIGS. 5 and 6 of the drawings wherein the inner container 16 is substantially centered within the outer container 12 such that a longitudinal axis of the inner container 16 is oriented substantially parallel to a longitudinal axis of the outer container 12. Further, it is desirable that the inner container 16 be centered such that longitudinal sides thereof are spaced an equal distance from the longitudinal sides of the outer container 12, with transverse sides of the inner container 16 being spaced an equal distance from the transverse sides of the outer container 12. By this structure, a plurality of animals can be radially positioned about the outer container 12 and similarly afforded a full depth of the fluid contained within the outer container 12 located between the inner container 16 and the outer container.

The present invention 10 may be constructed entirely of flexible and washable polymeric materials. Preferably, the invention 10 is molded of a polymeric material which is brightly colored so as to assist an end user in locating the invention within limited light conditions. Further, it is desirable for the invention 10 to be molded of a luminescent or "glow-in-the-dark" material so as to facilitate a location thereof in a dark area such as a yard. Examples of suitable polymers for use in constructing the present invention can be found within the U.S. Pat. Nos.: 4,612,343; 4,259,229; 3,427,273; and 5,237,448, all of which are incorporated herein by reference.

In use, the pet food dish 10 according to the present invention can be easily utilized to support a quantity of pet food in a position inaccessible by insects and other crawling creatures. The lids 14 and 18 permit the device 10 to be sealed and transported as desired even when full of food and water.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A pet food dish comprising:

an outer container having an outer container lid sealingly secured across an open upper end of the outer container;

an inner container positioned completely within the outer container and secured to an interior portion thereof, with an inner container lid sealingly engaged to the inner container so as to extend across an open upper end thereof, the inner container being spaced from an interior surface of the outer container such that when fluid is positioned within the outer container it completely surrounds the inner container;

wherein the outer container comprises a substantially rectangular outer container bottom wall having an outer container perimeter side wall projecting upwardly from an outer peripheral edge of the outer container bottom wall, the outer container perimeter side wall extending upwardly from the outer container bottom wall and terminating in an upper free edge, the upper free edge including a projecting flange extending from the upper free edge of the outer container perimeter side wall, with the outer container lid being shaped so as to define an interior groove extending about an interior surface of the outer container lid, with the flange of the outer container being cooperatively engaged with the groove of the outer container lid so as to secure the lid relative to the container;

wherein the inner container comprises a substantially rectangular inner container bottom wall having an inner container perimeter side wall projecting upwardly from an inner peripheral edge of the inner container bottom wall, the inner container perimeter side wall extending upwardly from the inner container bottom wall and terminating in an upper free edge, the upper free edge including a projecting flange extending from the upper free edge of the inner container perimeter side wall, with the inner container lid being shaped so as to define an interior groove extending about an interior surface of the inner container lid, with the flange of the inner container being cooperatively engaged with the groove of the inner container lid so as to secure the lid relative to the container;

wherein the lids each include a substantially rectangular planar member having an angled side wall projecting outwardly at an oblique angle relative thereto from an outer peripheral edge of the planar member, with the groove extending along an interior surface of the angled side wall;

wherein the inner container is oriented such that a longitudinal length thereof extends transversely across an interior of the outer container;

wherein a longitudinal dimension of the inner container is substantially less than a transverse width of the outer container, with the outer container being symmetrically oriented about a transverse axis directed transversely across and bisecting the outer container and oriented substantially relative to a longitudinal axis of the outer container, with the inner container residing laterally of the transverse axis bisecting the outer container;

wherein the inner container is substantially centered within the outer container such that a longitudinal axis of the inner container is oriented substantially parallel to a longitudinal axis of the outer container;

wherein the inner container is centered within the outer container such that longitudinal sides of the inner container are spaced an equal distance from longitudinal sides of the outer container, with transverse sides of the inner container being spaced an equal distance from transverse sides of the outer container;

wherein the bottom wall of the inner container is integrally formed with the bottom wall of the outer container.

2. The pet food dish of claim 1, wherein the outer container is constructed of a flexible polymeric material.

3. The pet food dish of claim 2, wherein the polymeric material of the outer container is brightly colored.

4. The pet food dish of claim 2, wherein the polymeric material of the outer container comprises a luminescent material.

5. A pet food dish comprising:

an outer container having an outer container lid sealingly secured across an open upper end of the outer container;

an inner container positioned completely within the outer container and secured to an interior portion thereof, with an inner container lid sealingly engaged to the inner container so as to extend across an open upper end thereof, the inner container being spaced from an interior surface of the outer container such that when fluid is positioned within the outer container it completely surrounds the inner container;

wherein the outer container comprises a substantially rectangular outer container bottom wall having an outer container perimeter side wall projecting upwardly from an outer peripheral edge of the outer container bottom wall;

wherein the inner container comprises a substantially rectangular inner container bottom wall having an inner container perimeter side wall projecting upwardly from an inner peripheral edge of the inner container bottom wall;

wherein the bottom wall of the inner container is integrally formed with the bottom wall of the outer container.

6. The pet food dish of claim 5, wherein the outer container perimeter side wall extends upwardly from the outer container bottom wall and terminates in an upper free edge, the upper free edge including a projecting flange extending from the upper free edge of the outer container perimeter side wall, with the outer container lid being shaped so as to define an interior groove extending about an interior surface of the outer container lid, with the flange of the outer container being cooperatively engaged with the groove of the outer container lid so as to secure the lid relative to the container.

7. The pet food dish of claim 5, wherein the inner container perimeter side wall extends upwardly from the inner container bottom wall and terminates in an upper free edge, the upper free edge including a projecting flange extending from the upper free edge of the inner container perimeter side wall, with the inner container lid being shaped so as to define an interior groove extending about an interior surface of the inner container lid, with the flange of the inner container being cooperatively engaged with the groove of the inner container lid so as to secure the lid relative to the container.

8. The pet food dish of claim 5, wherein the inner container is oriented such that a longitudinal length thereof extends transversely across an interior of the outer container.

9. The pet food dish of claim 5, wherein a longitudinal dimension of the inner container is substantially less than a transverse width of the outer container, with the outer container being symmetrically oriented about a transverse axis directed transversely across and bisecting the outer container and oriented substantially orthogonally relative to a longitudinal axis of the outer container, with the inner container residing laterally of the transverse axis bisecting the outer container.

10. The pet food dish of claim 9, wherein the inner container is substantially centered within the outer container such that a longitudinal axis of the inner container is oriented substantially parallel to a longitudinal axis of the outer container.

11. The pet food dish of claim 10, wherein the inner container is centered within the outer container such that longitudinal sides of the inner container are spaced an equal distance from longitudinal sides of the outer container, with transverse sides of the inner container being spaced an equal distance from transverse sides of the outer container.

12. A pet food dish comprising:

an outer container having an outer container lid sealingly secured across an open upper end of the outer container;

an inner container positioned completely within the outer container and fixedly and non-removably secured to an interior portion thereof, with an inner container lid sealingly engaged to the inner container so as to extend across an open upper end thereof, the inner container being spaced from an interior surface of the outer container such that when fluid is positioned within the outer container it completely surrounds the inner container.

\* \* \* \* \*